United States Patent
Tanev

(10) Patent No.: US 7,538,063 B2
(45) Date of Patent: *May 26, 2009

(54) BISMUTH- AND PHOSPHORUS-CONTAINING REFORMING CATALYSTS, METHOD OF MAKING AND NAPHTHA REFORMING PROCESS

(75) Inventor: Peter Tanev Tanev, Katy, TX (US)

(73) Assignee: Shell Oil Company, Houston, TX (US)

( * ) Notice: Subject to any disclaimer, the term of this patent is extended or adjusted under 35 U.S.C. 154(b) by 703 days.

This patent is subject to a terminal disclaimer.

(21) Appl. No.: 11/031,839

(22) Filed: Jan. 6, 2005

(65) Prior Publication Data

US 2005/0121364 A1    Jun. 9, 2005

Related U.S. Application Data

(60) Division of application No. 10/216,155, filed on Aug. 8, 2002, now Pat. No. 6,864,212, which is a continuation-in-part of application No. 10/154,458, filed on May 22, 2002, now Pat. No. 6,667,270.

(51) Int. Cl.
| | |
|---|---|
| *B01J 27/00* | (2006.01) |
| *B01J 27/192* | (2006.01) |
| *B01J 27/185* | (2006.01) |
| *B01J 27/13* | (2006.01) |
| *B01J 20/00* | (2006.01) |
| *B01J 21/04* | (2006.01) |
| *B01J 23/02* | (2006.01) |
| *C10G 57/00* | (2006.01) |
| *C10G 61/02* | (2006.01) |
| *C10G 63/02* | (2006.01) |
| *C10G 69/02* | (2006.01) |
| *C10G 35/04* | (2006.01) |
| *C10G 59/02* | (2006.01) |

(52) U.S. Cl. .......... 502/202; 502/208; 502/212; 502/213; 502/230; 502/415; 502/439; 208/62; 208/63; 208/64; 208/133; 208/134; 208/135; 208/136; 208/137; 208/138; 208/139

(58) Field of Classification Search .......... 502/208, 502/212, 213, 230, 415, 439; 208/62–64, 208/133–139
See application file for complete search history.

(56) References Cited

U.S. PATENT DOCUMENTS

| | | | |
|---|---|---|---|
| 2,479,109 A | 8/1949 | Haensel | 502/230 |
| 2,479,110 A | 8/1949 | Haensel | 208/139 |
| 2,890,167 A | 6/1959 | Haensel | 208/139 |
| 3,415,737 A | 12/1968 | Kluksdhal | 208/139 |
| 3,558,477 A | 1/1971 | Kluksdhal | 208/138 |
| 3,578,583 A | 5/1971 | Buss | 208/138 |
| 3,654,142 A | 4/1972 | Moravec, Jr. et al. | 208/140 |
| 3,706,815 A | 12/1972 | Alley, Jr. | 260/683 |
| 3,798,155 A | 3/1974 | Wilhelm | 208/139 |
| 3,859,201 A | 1/1975 | Wilhelm | 208/139 |
| 3,875,048 A | 4/1975 | Iwaisako et al. | 208/139 |

(Continued)

FOREIGN PATENT DOCUMENTS

WO    WO8402663    7/1984

*Primary Examiner*—Patricia L Hailey

(57) ABSTRACT

Bismuth- and phosphorus-containing naphtha reforming catalysts, methods of making such catalysts, and a naphtha reforming process using such catalysts.

33 Claims, 6 Drawing Sheets

U.S. PATENT DOCUMENTS

| | | | |
|---|---|---|---|
| 3,888,763 A | 6/1975 | Wilhelm | 208/139 |
| 3,900,387 A | 8/1975 | Wilhelm | 208/139 |
| 3,950,270 A | 4/1976 | Paynter et al. | 252/464 |
| 4,036,743 A | 7/1977 | Antos | 208/139 |
| 4,356,081 A | 10/1982 | Gallagher et al. | 208/139 |
| 4,367,137 A | 1/1983 | Antos et al. | 208/139 |
| 4,416,804 A | 11/1983 | Antos et al. | 502/213 |
| 4,426,279 A | 1/1984 | Antos et al. | 208/138 |
| 4,463,104 A | 7/1984 | Antos et al. | 502/213 |
| 4,483,767 A * | 11/1984 | Antos et al. | 208/138 |
| 4,487,848 A * | 12/1984 | Robinson et al. | 502/223 |
| 4,522,935 A | 6/1985 | Robinson et al. | 502/223 |
| 5,905,053 A | 5/1999 | Rizkalla et al. | 502/216 |
| 6,083,867 A | 7/2000 | Wu et al. | 502/241 |
| 6,172,273 B1 | 1/2001 | Wu et al. | 585/419 |
| 6,183,719 B1 | 2/2001 | Müller et al. | 423/625 |
| 6,383,967 B1 | 5/2002 | Holmgren et al. | 502/64 |
| 6,667,270 B2 * | 12/2003 | Tanev | 502/208 |
| 6,864,212 B2 * | 3/2005 | Tanev | 502/208 |

* cited by examiner

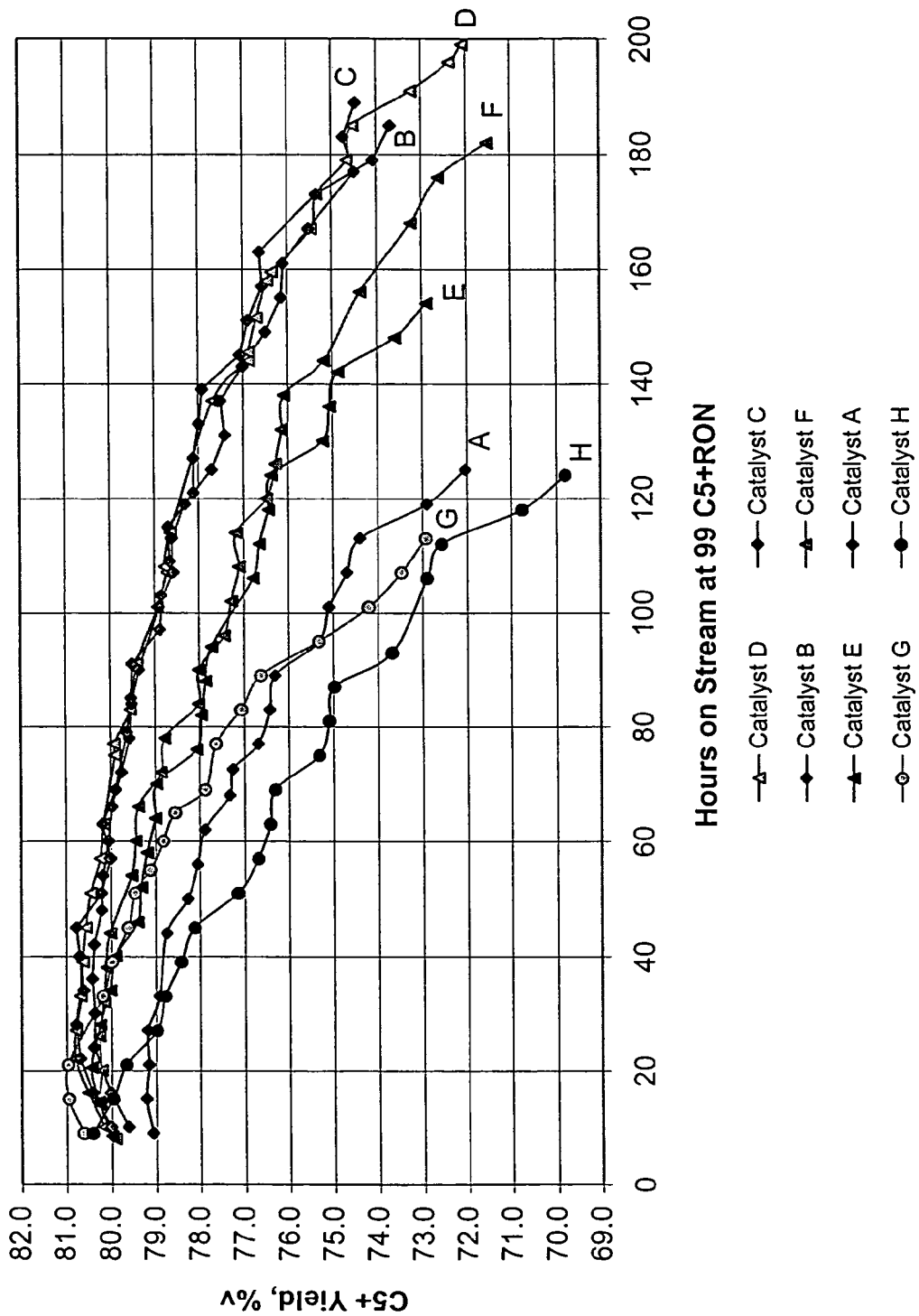

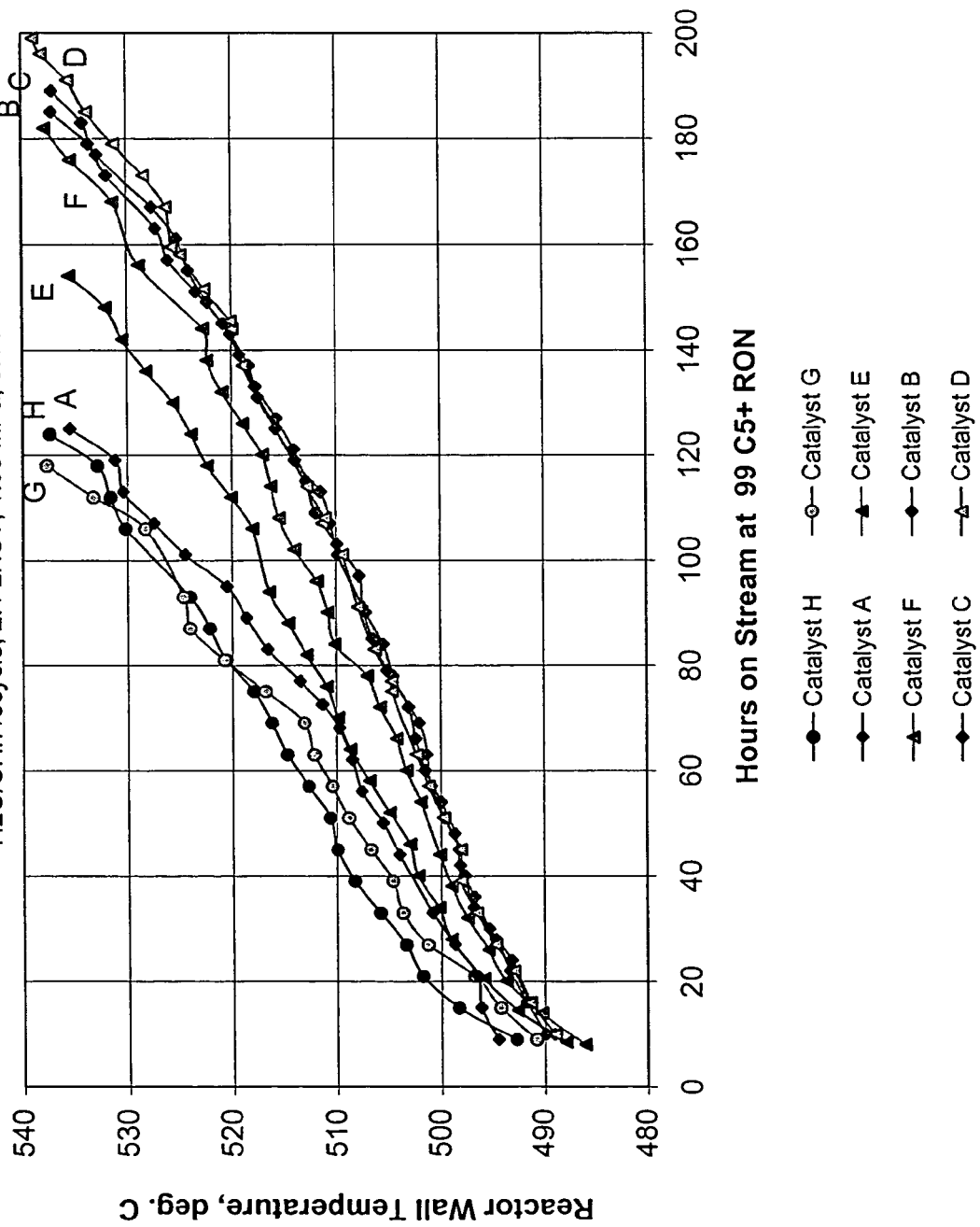

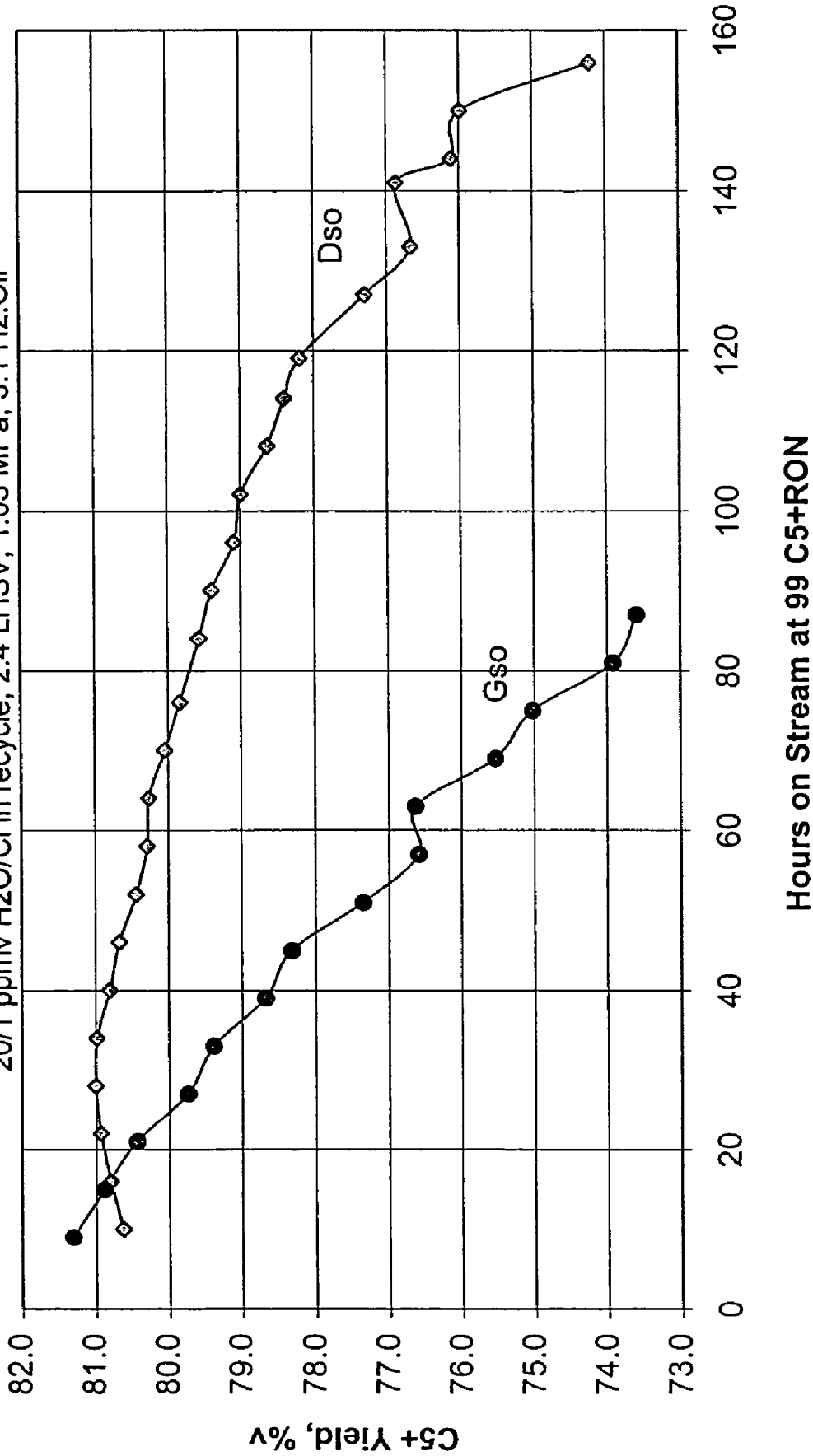
Figure 3. C5+Yield Decline Data for Steamed and Oxychlorinated Catalysts Dso and Gso
Test Conditions: Hydrotreated naphtha feed (51/34/15 % w Paraffins/Naphthenes/Aromatics), 20/1 ppmv H2O/Cl in recycle, 2.4 LHSV, 1.03 MPa, 3:1 H2:Oil

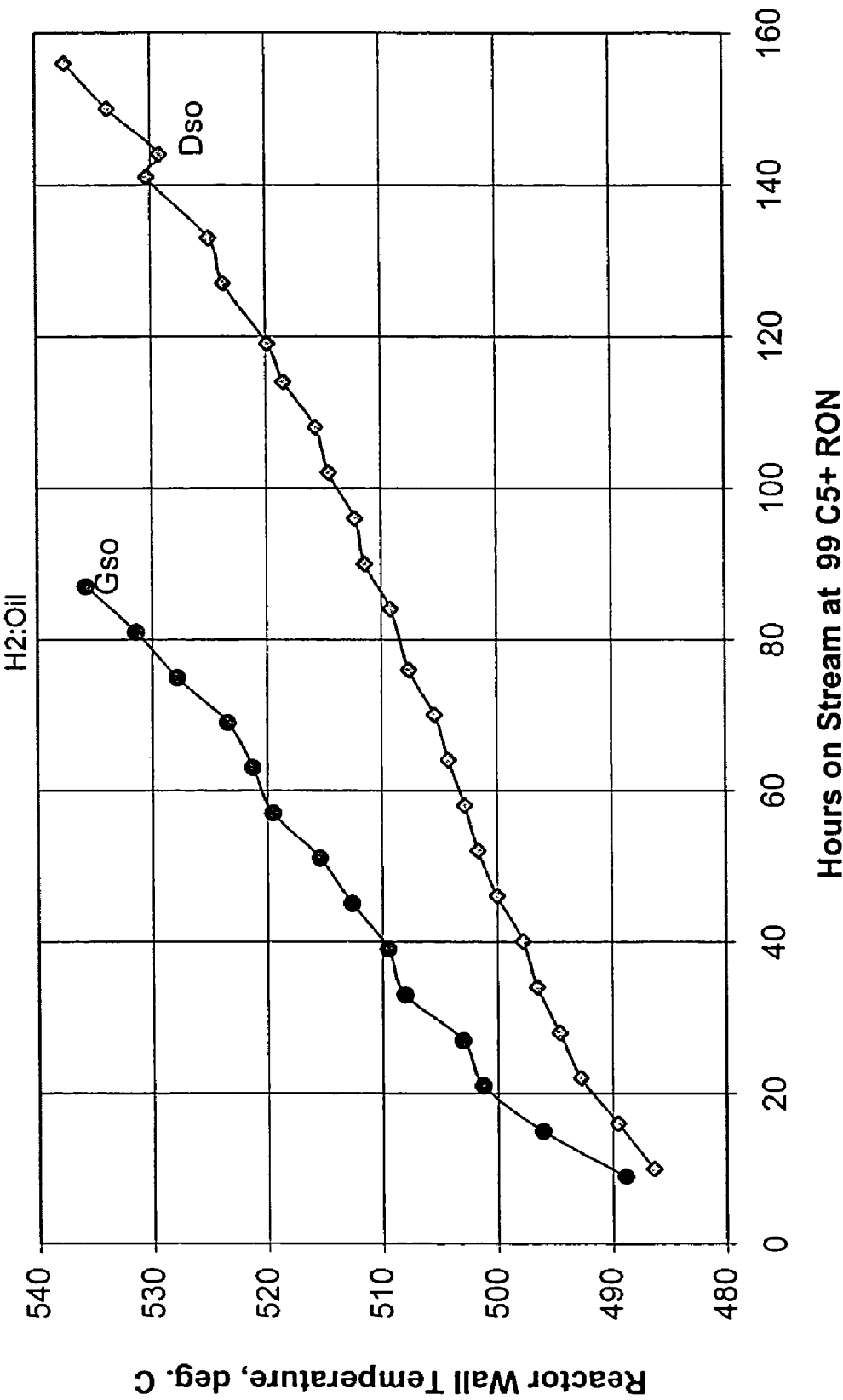

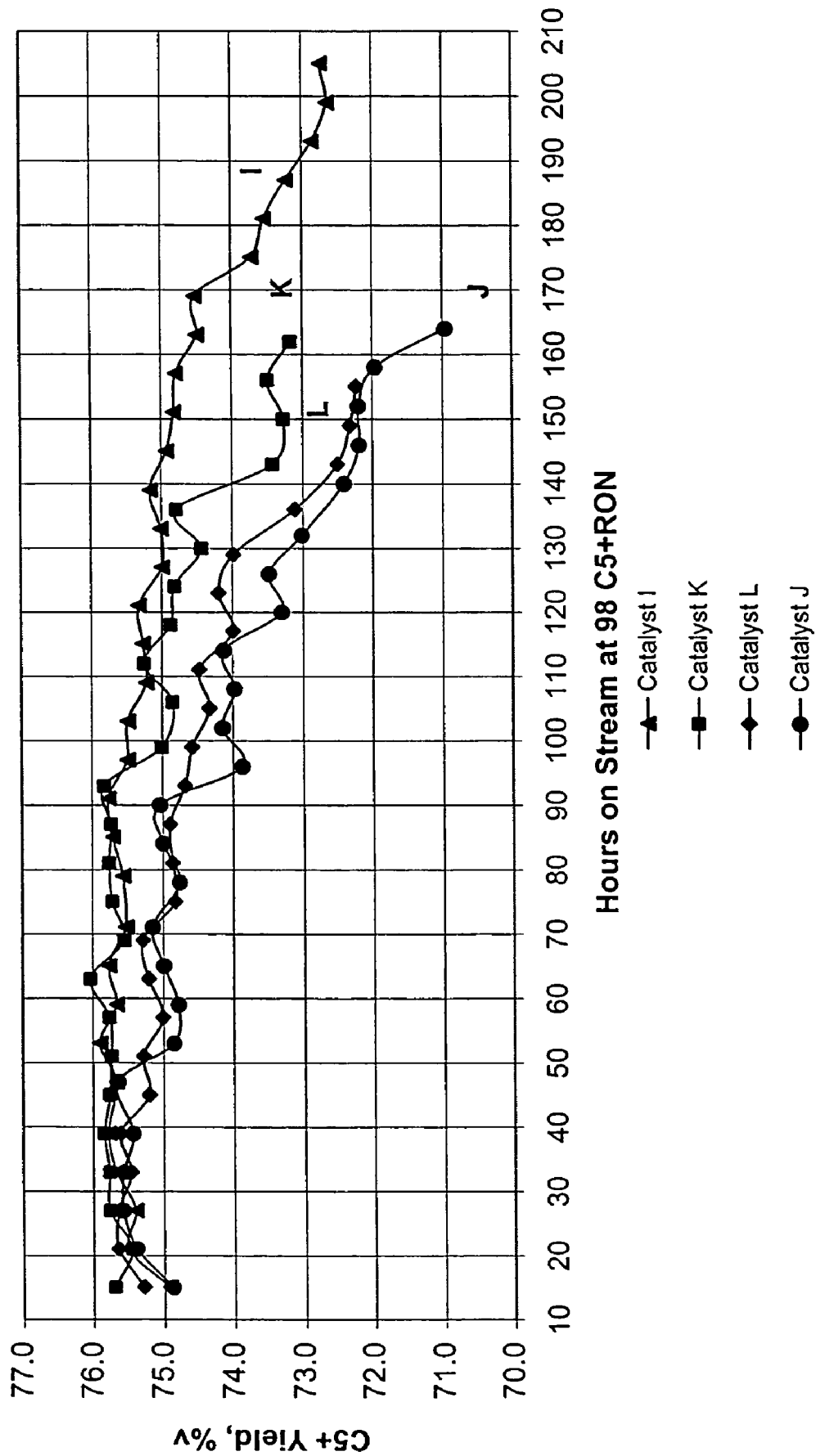

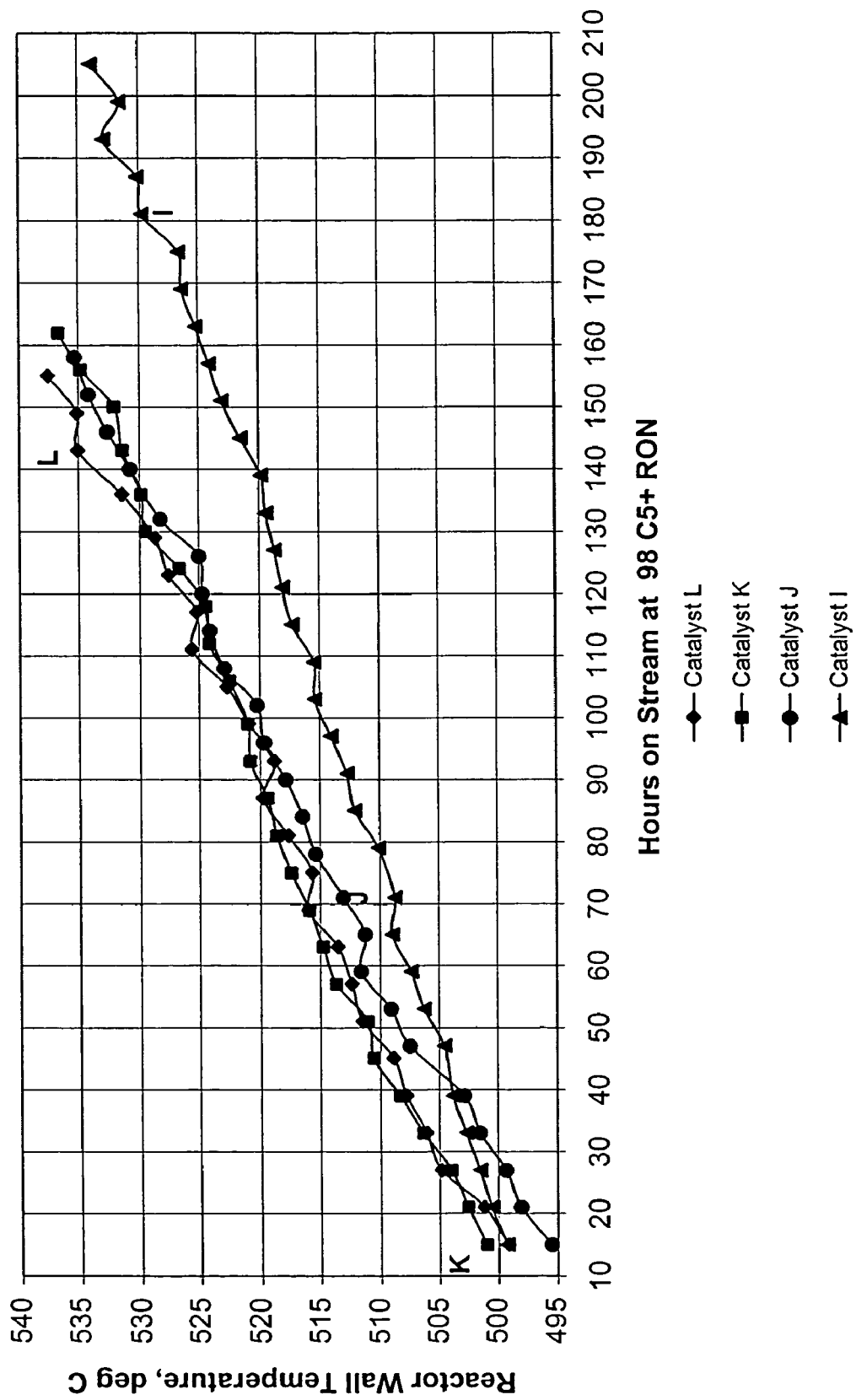

BISMUTH- AND PHOSPHORUS-CONTAINING REFORMING CATALYSTS, METHOD OF MAKING AND NAPHTHA REFORMING PROCESS

This application is a division of application Ser. No. 10/216,155 filed Aug. 8, 2002, now U.S. Pat. No. 6,864,212 the entire disclosure of which is hereby incorporated by reference which is a continuation-in-part of application Ser. No. 10/154,458 filed May 22, 2002, now U.S. Pat. No. 6,667,270 granted Dec. 23, 2003, the entire disclosure of which is hereby incorporated by reference.

FIELD OF THE INVENTION

This invention relates to bismuth- and phosphorus-containing naphtha reforming catalysts, methods of making such catalysts, and to a naphtha reforming process using such catalysts.

BACKGROUND OF THE INVENTION

Catalytic naphtha reforming is an important oil refining process that converts low-octane paraffins- and naphthenes-rich naphtha to high-octane, aromatics-rich $C_5+$ liquid (reformate) and hydrogen ($H_2$). Petroleum refiners are always searching for improved reforming catalysts that afford high selectivity (i.e., high $C_5+$ liquid and $H_2$ yields), high activity, low coking rates and high selectivity and/or activity stability. More selective catalysts are desired to maximize the production of valuable $C_5+$ liquid and $H_2$ while minimizing the yields of less desirable $C_1$-$C_4$ gaseous products. Catalysts with acceptable selectivity but higher activity are also desired because they allow operation at lower reactor inlet temperatures while maintaining the same conversion (octane) level or allow operation at the same temperature but at higher conversion (octane) level. In the former case, the higher activity of the catalysts also allows for significant extension of the cycle length and reduced frequency of regeneration. Catalysts that afford lower coke make rates and higher selectivity and/or activity stability are also very highly desired because they allow for significant shortening of the coke burn off and unit turnaround time or for a longer operation before regeneration.

Many researchers have devoted their efforts to the discovery and development of improved reforming catalysts. The original commercial catalysts employed a platinum-group metal, preferably platinum itself, deposited on a halogen-acidified γ-alumina support; see, for example, Haensel's U.S. Pat. Nos. 2,479,109-110, granted in 1949 and assigned to Universal Oil Products Company. About 1968, the use of rhenium together with platinum was introduced. Kluksdhal's U.S. Pat. No. 3,415,737 teaches Pt/Re catalysts wherein the atomic ratio of rhenium to platinum is between 0.2 and 2.0 and his U.S. Pat. No. 3,558,477 teaches the importance of holding the atomic ratio of rhenium to platinum to less than 1.0. Buss's U.S. Pat. No. 3,578,583 teaches the inclusion of a minor amount, up to 0.1 percent, of iridium in a catalyst having up to 0.3 percent each of rhenium and platinum. Gallagher et al.'s U.S. Pat. No. 4,356,081 teaches a bimetallic reforming catalyst wherein the atom ratio of rhenium to platinum is between 2 and 5.

Phosphorus has been known to increase aromatics yield when included in reforming catalysts since at least 1959 when Haensel taught the same in U.S. Pat. No. 2,890,167. In U.S. Pat. No. 3,706,815, Alley taught that incorporating chelating ions of a Group VIII noble metal with polyphosphoric acid in a catalyst enhances isomerization activity. And Antos et al.'s U.S. Pat. Nos. 4,367,137, 4,416,804, 4,426,279, and 4,463,104 taught that the addition of phosphorus to a noble-metal reforming catalyst results in improved $C_5+$ yields.

In 1974-5, Wilhelm's U.S. Pat. Nos. 3,798,155, 3,888,763, 3,859,201 and 3,900,387 taught the inclusion of bismuth in a platinum-group reforming catalyst to improve selectivity, activity and stability characteristics. Antos' U.S. Pat. No. 4,036,743 taught a hydrocarbon conversion catalyst comprising platinum, bismuth, nickel and halogen components. More recently, Wu et al.'s U.S. Pat. Nos. 6,083,867 and 6,172,273 B1 taught a reforming catalyst of mixed composition or stage-loaded catalyst system comprising a first catalyst comprising platinum and rhenium on a porous carrier material and a second catalyst comprising a bismuth and silica components.

Until now, however, no one has taught the unexpected performance benefits of including both bismuth and phosphorus in a noble-metal naphtha reforming catalyst.

SUMMARY OF THE INVENTION

This invention provides for catalysts comprising γ-alumina, bismuth, phosphorus, platinum, chlorine, and optionally rhenium. The invention also provides for a method of making such catalyst compositions and for a process for reforming naphtha to improve its octane using such catalysts. When used to catalyze reforming of naphtha, the bismuth- and phosphorus-containing catalyst compositions of this invention unexpectedly exhibited significantly lower coking rates and $C_5+$ yields and activity decline rates; i.e., higher stability, relative to catalysts containing only either bismuth or phosphorus previously known.

BRIEF DESCRIPTION OF THE DRAWINGS

FIG. 1 shows $C_5+$ Yield Decline Data for Catalysts A to H.
FIG. 2 shows Activity Decline Data for Catalysts A to H.
FIG. 3 shows $C_5+$ Yield Decline Data for steamed and oxychlorinated Catalysts $D_{SO}$ and $G_{SO}$.
FIG. 4 shows Activity Decline Data for steamed and oxychlorinated Catalysts $D_{SO}$ and $G_{SO}$.
FIG. 5 shows $C_5+$ Yield Decline Data for Catalysts I to L.
FIG. 6 shows Activity Decline Data for Catalysts I to L.

DETAILED DESCRIPTION

The catalyst compositions of this invention comprise alumina, primarily γ-alumina, and catalytically effective amounts of bismuth, phosphorus, platinum and chlorine, and optionally a catalytically effective amount of rhenium. It has been found that the inclusion of small amounts of both bismuth and phosphorus results in significant improvement in the $C_5+$ yield and activity stability relative to the conventional catalyst compositions. In addition, the bismuth and phosphorus promoters in the catalyst allow for significant suppression of the coking rate and remarkable improvement in the regenerability of the catalyst after moisture upset. The catalytically effective amount of Pt in the catalyst provides the desired hydrogenation-dehydrogenation functionality, the catalytically effective amount of Re (when present) improves the coke tolerance and resistance to deactivation, and the catalytically effective amount of Cl enhances the acidity of the support and provides the desired acidic (isomerization and cracking) functionality. Inclusion of Bi, P, Pt, Re and Cl in a naphtha reforming catalyst is well known in the art. However, when both bismuth and phosphorus are impregnated onto the alumina support or co-mulled with the alumina during forming of the supports of the present invention, the catalysts exhibit significantly lower coking rates and higher $C_5$+ yield and activity stability than conventional catalysts containing only bismuth or phosphorus. Therefore, the catalyst compositions of the present invention will allow for a reduction of the frequency of catalyst regeneration and maximization of unit uptime, reformate production and profitability. In the rare cases when higher stability is not desired, these compositions would still provide significant cost savings to the refiner because of their lower coke make rates, shorter coke burn off time and unit turnaround time during regeneration relative to conventional catalysts. The lower coking rates of the compositions of this invention could be of a great benefit to refiners operating the two different types of fixed-bed reforming units: cyclic and semi-regenerative.

Catalyst Preparation

The bismuth- and phosphorus-containing reforming catalysts of this invention may be prepared as described in the parent of this application wherein a support comprising γ-alumina throughout which effective amounts of bismuth and phosphorus have been essentially homogeneously distributed is impregnated with catalytically effective amounts of platinum, chlorine, and optionally rhenium. These preparation techniques are described below and in Examples 1, 3 and 6. For convenience, this bismuth and phosphorus deposition/catalyst preparation procedure is referred to herein as the "Co-mulling Procedure".

Alternatively, these catalysts may be prepared by impregnating a support comprising γ-alumina with catalytically effective amounts of bismuth, phosphorus, platinum, chlorine, and optionally rhenium, using one or more impregnating solutions. That is, either compounds of all the elements desired on the finished catalyst may be contained in a single impregnating solution or several solutions, each containing compounds of one or more of the desired elements, may be used. In the latter case, the order in which the desired elements are impregnated onto the support is immaterial. Examples 11 and 12 describe such catalyst preparation using a single impregnating solution. For convenience, this bismuth and phosphorus deposition/catalyst preparation procedure is referred to herein as the "Impregnation Procedure".

Finally, these catalysts may be prepared by co-mulling a catalytically effective amount of either bismuth or phosphorus with alumina powder and alumina sol during preparation of the support followed by impregnating the support with a catalytically effective amount of a compound of the promoter not co-mulled during support preparation and with catalytically effective amounts of platinum, chlorine, and optionally rhenium, using one or more impregnating solutions. Examples 13 and 14 describe these techniques. For convenience, this bismuth and phosphorus deposition/catalyst preparation procedure is referred to herein as the "Combination Procedure".

Co-Mulling Procedure

In this procedure for making catalysts of the present invention, effective amounts of bismuth and phosphorus are distributed throughout the support particles by incorporation of these promoters into the support precursor mixture prior to forming the support particles, which is usually accomplished by extrusion. Between 0.05 wt. % and 0.1 wt. %, based on the finished catalyst, of bismuth has been found to be effective, with between 0.05 wt. % and 0.08 wt. % being preferred. Between 0.05 wt. % and 0.6 wt. %, based on the finished catalyst, of phosphorus is effective, with between 0.1 wt. % and 0.4 wt. % being preferred, and between 0.25 wt. % and 0.35 wt. % being particularly preferred.

The forming of the support particles may be accomplished by any of the methods known to those skilled in the art. In the preferred method, a mixture comprising approximately 62 wt. % of γ-alumina powder and 38% wt. alumina sol is prepared. The γ-alumina is a high-purity γ-alumina made by digestion of aluminum wire in acetic acid followed by aging to form alumina sol and spray drying of the sol to form the alumina powder. The alumina sol is also prepared as described above (i.e., by digesting aluminum wire in acetic acid and aging) and contains about 10 wt. % alumina (dry basis), 3 wt. % of acetic acid and the remainder deionized water. The alumina sol is blended with the alumina powder and acts as a peptizing agent to aid the extrusion of the γ-alumina. Any other methods (other than using alumina sol; for example, using extrusion aids) known to those skilled in the art could also be used to form the alumina carrier particles of this invention. Such extrusion aids include but are not limited to acids (such as nitric, acetic, citric, etc.) and/or organic extrusions aids (such as methocel, PVI, steric alcohols, etc.)

The desired amounts of phosphorus and bismuth are essentially homogeneously incorporated into the finished support by adding to the γ-alumina/alumina sol mixture being blended an amount of phosphorus precursor solution sufficient to provide the desired concentration of phosphorus on the finished support and then an amount of the bismuth precursor solution sufficient to provide the desired concentration of bismuth on the finished support. The addition of phosphorus and bismuth solutions is accomplished at a slow rate followed by a period of continued blending to ensure homogeneous distribution of phosphorus and bismuth in the support. The final mix should be prepared in such a way so that to form an extrudable paste. Well extrudable paste is formed when the LOI (loss on ignition as determined at 1000° C.) of the mixture is between 30 and 70 wt. %, and more preferably between 45-60 wt. %.

To incorporate the desired amount of phosphorus into the support a solution of phosphorus precursor is prepared. The solution can be prepared by any of the methods known to those skilled in the art. The phosphorus precursor is selected from the group comprising phosphorus-containing acids and salts, for example, $H_3PO_4$, $H_3PO_3$, $H_3PO_2$, $NH_4H_2PO_4$, $(NH_4)_2HPO_4$, with $H_3PO_4$ being the most preferred precursor. The preferred precursor solution may contain between 50 and 85 wt. % $H_3PO_4$, with 70-85 wt. % $H_3PO_4$ being the most preferred.

To incorporate bismuth into the support in such a way so as to provide for a homogeneous distribution of the bismuth atoms, it is essential that a bismuth solution having all bismuth cations completely in solution and not indirectly interacting with each other (via chemical bonds with other elements) be used. A number of bismuth precursors, including but not limited to $Bi(NO_3)_3.5H_2O$, $BiCl_3$, $BiOCl$, $BiBr_3$, Bi acetate, Bi citrate, and various Bi alcoxides may be used, with $Bi(NO_3)_3.5H_2O$ and Bi citrate being the most preferred. Solutions of these precursors in water, water+complexing agents (to improve bismuth solubility), acidified water solutions as well as different surfactants or organic solvent solutions may all be used to prepare the bismuth-containing supports and catalysts of the present invention. The acceptable concentration of bismuth in the solution is dependent on the bismuth precursor chosen, the nature of the solvent and the solubility range for the precursor in the solvent. The most preferred bismuth solution contains about 9 wt. % bismuth (from $Bi(NO_3)_3.5H_2O$) and approximately 10 wt. % d-mannitol (a complexing agent) and the balance water. Other complexing or chelating agents, including but not limited to polyacohols or mixtures of polyacohols or alcohols and acids could also be used instead of d-mannitol to achieve complete dissolution of the bismuth precursor in the solvent. The same effect could also be achieved by using acidified water solutions of the bismuth precursor.

The final steps in making the support of the present invention are forming the paste prepared above into particles of the support, followed by drying and, optionally, calcining. Any of the conventional support shapes, such as spheres, extruded cylinders and trilobes, etc. may be employed. The formed particles may be dried by any of the methods known to those skilled in the art. However, drying at low temperature, that is between 110° C. and 140° C. for over 10 hours is preferred. Drying should achieve a final support LOI level in the range of 10 wt. % to 36 wt. %, more preferably 17 wt. % to 36 wt. %. It is preferred that the dried support particles then be calcined in order to lower their LOI to between 1 wt. % and 10 wt. %, preferably between 1 wt. % and 7 wt. %. Calcination is done at a temperature between 400° C. and 750° C., preferably between 550° C. and 700° C. for a period of between 30 minutes and 5 hours, preferably between 1 hour and 2 hours.

To form the finished catalysts of this invention, catalytically active amounts of platinum and chlorine, and optionally rhenium, are deposited on the support by impregnation techniques known to those skilled in the art. Between 0.1 wt. % and 1.0 wt. %, based on the finished catalyst, of platinum has been found to be effective, with between 0.15 wt. % and 0.6 wt. % being preferred, and between 0.20 wt. % and 0.30 wt. % being particularly preferred. Between 0.05 wt. % and 2.0 wt. %, based on the finished catalyst, of chlorine has been found to be effective, with between 0.8 wt. % and 1.2 wt. % being preferred, and between 0.9 wt. % and 1.1 wt. % being particularly preferred. If rhenium is present, between 0.01 wt. % and 1.0 wt. %, based on the finished catalyst, of rhenium has been found to be effective, with between 0.1 wt. % and 0.5 wt. % being preferred, and between 0.2 wt. % and 0.45 wt. % being particularly preferred.

Various Pt, Cl and Re precursors known to those skilled in the art can be used to prepare impregnating solutions and to impregnate the support of this invention. Such precursors include but are not limited to chloroplatinic acid, ammoniumchloroplatinate, tetrachloroplatinate, dinitrodiaminoplatinum, hydrochloric acid, tetrachloromethane, chloromethane, dichloromethane, 1,1,1-trichloroethane, ammonium chloride, perrhenic acid, and ammonium perrhenate. Any precursor that will decompose in water, thereby providing the necessary ions for deposition on the support, is acceptable. In addition, the impregnating solution may contain small amounts of different acids such as nitric, carbonic, sulfuric, citric, formic, oxalic, etc. which are known to those skilled in the art to improve the distribution of the platinate and, in the case of rhenium, the perrhenate anions on the alumina carrier. The Pt, Cl and optionally Re concentration of the impregnating solution is determined in such a way to achieve the desired concentration of these components on the finished catalyst. All impregnation techniques known to those skilled in the art may be used to prepare the catalysts of this invention.

Impregnation Procedure

In this procedure, support particles comprising γ-alumina prepared by any of the methods known to those skilled in the art are impregnated with one or more solutions containing precursors of bismuth, phosphorus, platinum, chlorine and optionally rhenium as described in the above discussion of Co-mulling Procedure. The deposited concentrations of such elements on the finished catalyst are within the ranges described in the above discussion of Co-mulling Procedure, with the exception of bismuth for which the deposited concentration should be between 0.03 wt. % and 0.1 wt. %, based on the finished catalyst. Precursor compounds of all the elements desired on the finished catalyst contained in a single impregnating solution or several solutions, each containing compounds of one or more of the desired elements, may be used. In the latter case, the order in which the desired elements are impregnated onto the support is immaterial.

Combination Procedure

In this procedure, support particles comprising γ-alumina and an effective amount of one promoter selected from bismuth and phosphorus distributed throughout are prepared following the technique described in the above discussion of Co-mulling Procedure. These particles are then impregnated with effective amounts of the other promoter and platinum, chlorine and optionally rhenium as described above in the discussion on Impregnation Procedure.

Process for Reforming Naphtha

Reforming of hydrotreated naphtha feed may be achieved by contacting such feed with the catalyst of the present invention in the presence of hydrogen at elevated temperature and pressure. The operating conditions are a space velocity between 0.5 $hr^{-1}$ and 6 $hr^{-1}$, preferably between 1 $hr^{-1}$ and 3 $hr^{-1}$, a pressure of between about 0.1 MPa and about 3.5 MPa, preferably between 1 MPa and 3 MPa, a temperature between about 315° C. and about 550° C., preferably between 480° C. and 540° C., a hydrogen recycle gas to hydrocarbon feed ratio between about 1 mol/mol and 10 mol/mol, preferably between about 1.5 mol/mol and 8 mol/mol, and more preferably between about 2 mol/mol and 6 mol/mol.

EXAMPLES

The following examples illustrate the preparation of the supports and catalysts of this invention. A number of examples illustrate the use of such catalysts in reforming of naphtha and compare their performance to conventional naphtha reforming catalysts. These examples should not be considered as limiting the scope of this invention.

Example 1

This example describes the preparation of five catalyst supports of the present invention, each containing a different concentration of bismuth.

Support A was prepared by mixing 1 kg of γ-alumina with 627 g of alumina sol in a blender for 10 minutes. With the blender running, 9.1 g of 85 wt. % $H_3PO_4$ were slowly added and blending continued for about another minute. Then, the bismuth solution defined in Table 1 for Support A was added to the blender and the blending was continued for another 7 minutes to form an extrudable paste. The paste was extruded into 1.6 mm diameter pellets which were dried at 125° C. overnight. The pellets were then sized to a predominant length of 4 to 6 mm and calcined at 660° C. for 1.5 hours. The finished Support A had the composition shown in Table 1.

Supports B, C, D and E were prepared in the same manner, except that Solution A was replaced with the solution appropriate for each support as shown in Table 1.

TABLE 1

| Support | A | B | C | D | E |
|---|---|---|---|---|---|
| Solution: | | | | | |
| g $Bi(NO_3)_3 \cdot 5H_2O$ | 3.20 | 1.87 | 1.49 | 1.12 | 0.747 |
| g d-mannitol | 1.50 | 0.90 | 0.72 | 0.54 | 0.36 |
| g deionized $H_2O$ | 10.0 | 6.0 | 4.5 | 3.5 | 2.5 |
| Finished Support: | | | | | |

TABLE 1-continued

| Support | A | B | C | D | E |
|---|---|---|---|---|---|
| Bi, wt. % | 0.17 | 0.10 | 0.08 | 0.06 | 0.04 |
| P, wt. % | 0.3 | 0.3 | 0.3 | 0.3 | 0.3 |
| $Al_2O_3$ | Balance | Balance | Balance | Balance | Balance |

A small sample of Support D was sulfided by mounting a few pellets on the bottom of a glass Petrie dish, adding a drop of 20 wt. % ammonium sulfide solution, closing the glass lid, and allowing the pellets to be exposed to the ammonium sulfide vapors for about 10 minutes. During this treatment the bismuth atoms in the extrudate reacted with the ammonium sulfide, yielding dark gray bismuth sulfide. Examination of the sulfided pellets showed them to be uniformly dark gray, in contrast to the milky-white un-sulfided pellets, confirming that the bismuth atoms were homogeneously distributed throughout the support.

Example 2

Comparative

This example describes the preparation of three conventional catalyst supports, Support F comprising alumina containing the same concentration of bismuth as Support D of Example 1, i.e., 0.06 wt. %; Support G comprising alumina containing the same concentration of phosphorus as the supports of Example 1, i.e., 0.3 wt. %; and Support H comprising pure alumina.

Support F was prepared following the procedure described in Example 1 except no $H_3PO_4$ was added. Support G was prepared following the procedure described in Example 1 except no Bi/d-mannitol solution was added. Support H was prepared in like manner except neither $H_3PO_4$ nor Bi/d-mannitol solution were added.

Example 3

This example describes the preparation of five catalysts of the present invention, each containing a different concentration of bismuth in its support.

Five impregnating solutions were prepared, each by mixing 0.77 ml of concentrated $HNO_3$, 1.97 ml of concentrated (12M) HCl and 0.660 g of a solution of chloroplatinic acid (denoted as CPA, 29.7 wt. % Pt) and 30 ml of deionized water. The solutions were stirred and another 120 ml of deionized water were added to bring the total volume of each of the impregnating solutions to 150 ml. The solutions were then placed in a 500 ml. graduated cylinder and circulated with the aid of a peristaltic pump. In addition, $CO_2$ gas was bubbled at a very low rate through a gas dispersion tube placed in the bottom of the graduated cylinder and into the solution. This was done in order to provide $HCO_3^-$ anions which are known to those skilled in the art as capable of competing with Pt and Re anions for alumina surface and to provide for better distribution of these metals on the alumina support.

To impregnate each of Supports A-E from Example 1, once the solution circulation and $CO_2$ gas bubbling were established, 70 g of the support were quickly added to the solution in the cylinder. The impregnating solution was then circulated over the support for 3 hrs while bubbling $CO_2$ and then the $CO_2$ gas and the circulation were stopped. The solution was drained and the catalyst was dried at 125° C. for 2 hr and at 250° C. for 4 hrs and then calcined at 525° C. for 1.5 hrs. Each of the finished catalysts, designated Catalysts A-E corresponding to Supports A-E, were analyzed and found to contain about 0.25 wt. % Pt, about 0.95 wt. % Cl and the corresponding amounts of Bi and P (See Example 1, Table 1).

Example 4

Comparative

This example describes the preparation of three conventional catalysts.

Three more impregnating solutions were prepared. These solutions were identical to those prepared in Example 3 except that 0.754 g of CPA solution were used instead of the 0.660 g of Example 3. Conventional Supports F, G and H from Example 2 were impregnated with these solutions in the same manner as in Example 3. Analysis of the finished catalysts showed Catalyst F to contain about 0.3 wt. % Pt and 1.0 wt. % Cl on a support containing 0.6 wt. % Bi, Catalyst G to contain about 0.30 wt. % Pt and 1.0 wt. % Cl on a support containing 0.3 wt. % P, and Catalyst H to contain about 0.30 wt. % Pt and 0.96 wt. % Cl on a support containing neither Bi nor P.

Example 5

This example describes the steaming and regeneration via oxychlorination treatments of Catalyst D from Example 3 and Catalyst G from Example 4.

Steaming: 40 g quantities of Catalysts D and G were placed in stainless steel racks and into a programmable furnace equipped with inlet and outlet lines. The furnace was closed and an airflow was established through the lines and the furnace chamber. The furnace temperature was then ramped from ambient to 500° C. while maintaining the airflow. Once 500° C. temperature was reached the airflow was turned off and a slow flow of water was established through the inlet line and into the heated furnace chamber. The water evaporated in the furnace chamber and steam was generated. The catalyst samples were subjected to steaming in the furnace for 16 hrs to insure significant Pt agglomeration. Then, the water was stopped, the heat was turned off and the airflow was again established. The samples were then cooled to 150° C. and transferred to an airtight container. Although there was evidence of Pt agglomeration on both samples, the steamed Catalyst D was much lighter in color than the steamed Catalyst G (which was darker gray), indicating higher resistance for Pt agglomeration for the bismuth- and phosphorus-containing Catalyst D of this invention.

Oxychlorination: Following the steaming treatment, both catalyst samples were subjected to a two-stage oxychlorination treatment. Such treatments are known to be able to restore the original high dispersion of the Pt on an alumina support and are extensively practiced by those skilled in the art to restore Pt dispersion, activity and selectivity of spent Pt reforming catalysts. In the first stage, a 2% mol $O_2/N_2$ plus $Cl_2$ gas carrying $H_2O$ and HCl vapors was passed through the catalyst bed at 500° C. for 5.5 hrs. In the second stage, the $Cl_2$ gas was turned off and 2% mol $O_2/N_2$ gas carrying $H_2O$ and HCl vapors was passed through the catalyst bed for another 5.5 hrs. The purpose of the first stage was to redisperse the Pt on the support to a level similar to that of the fresh catalyst, whereas the purpose of the second stage was to adjust the Cl to the desired level. The steamed and oxychlorinated sample of Catalyst D was designated Catalyst $D_{SO}$ and the similarly treated sample of Catalyst G was designated Catalyst $G_{SO}$. A visual inspection of Catalyst $D_{SO}$ revealed the absence of grayish colored pellets, indicating no agglomerated Pt. In contrast, the inspection of Catalyst $G_{SO}$ revealed the presence of grayish colored pellets. This indicates that the Bismuth- and P-containing Catalyst D of this invention better preserves and restores its Pt dispersion upon steaming and oxychlorination treatments than the conventional Catalyst G which contained phosphorus but no bismuth. Both catalysts were analyzed and found to contain very similar levels of Cl (0.83 wt. % and 0.81 wt. %, respectively).

Example 6

This example describes the preparation of a Pt- and Re-containing catalyst of this invention.

An impregnating solution was prepared from 0.50 ml of concentrated $HNO_3$, 1.89 ml of concentrated (12M) HCl and 0.660 g of a solution of CPA (29.7% w Pt), 0.302 g of $NH_4ReO_4$ and 50 ml of deionized water. The solution was stirred and more deionized water was added to bring the total volume of the solution to 150 ml. The solution was then placed in a 500 ml graduated cylinder and circulated with the aid of a peristaltic pump. In addition, $CO_2$ gas was bubbled at a very low rate through a gas dispersion tube placed in the bottom of the graduated cylinder and into the solution. Once the solution circulation and $CO_2$ gas bubbling were established, 70 g of Support D from Example 1 was added to the impregnating solution. The impregnating solution was circulated over the support for a period of 3 hrs while bubbling $CO_2$ gas and then the $CO_2$ and the circulation were stopped. The solution was drained and the catalyst was dried at 125° C. for 2 hr and at 250° C. for 4 hrs and calcined at 525° C. for 1.5 hrs. The finished catalyst was designated Catalyst I and on analysis was found to contain about 0.25 wt. % Pt, 0.26 wt. % Re, 0.99 wt. % Cl, 0.06 wt. % Bi, 0.30 wt. % P and the remainder alumina.

Example 7

Comparative

This example describes the preparation of samples of Pt- and Re-containing catalysts on conventional supports F, G and H of Example 2.

Samples of Supports F, G and H were each impregnated using the impregnating solution and procedure described in Example 6. The finished catalyst made from Support F, designated Catalyst J, was analyzed and found to contain 0.26 wt. % Pt, 0.24 wt. % Re, 0.06 wt. % Bi and 0.95 wt. % Cl. The finished catalyst made from Support G, designated Catalyst K, was analyzed and found to contain 0.25 wt. % Pt, 0.25 wt. % Re, 0.3 wt. % P and 0.98 wt. % Cl. The finished catalyst made from Support H, designated Catalyst L, was analyzed and found to contain 0.25 wt. % Pt, 0.25 wt. % Re and 0.96 wt. % Cl.

Examples 8-10 measure and compare the performance of the catalysts prepared above. In measuring catalyst performance in the reforming of naphtha, four terms are employed—selectivity, activity, stability and coking rate:

"Selectivity" is a measure of the yield of $C_5$+ liquids, expressed as a percentage of the volume of fresh liquid feed charged.

"Activity" is a measure of the reactor temperature required to achieve the target product octane.

"Stability" is a measure of a catalyst's ability to sustain its selectivity and activity over time. It is expressed as and is inversely proportional to the selectivity and activity decline rates.

"Coking Rate" is a measure of the tendency of a catalyst to make coke on its surface during the reforming process.

Because reforming catalysts deactivate by a mechanism of coke deposition, catalysts with lower coking rates usually exhibit lower $C_5$+ yield and Activity decline rates; i.e., higher stability than catalysts with higher coking rates.

Example 8

Comparative

This example compares the performance of Catalysts A to H when used to reform a full range ($C_5$-$C_{12}$ hydrocarbons) commercial hydrotreated naphtha feed having a paraffins/naphthenes/aromatics (P/N/A) content of 51/34/15 wt. %, respectively.

All tests were done in stainless steel micro-reactors operating under pseudo-adiabatic and once-through $H_2$ regime and equipped with feed and product tanks and an online full product ($H_2$+$C_1$-$C_{12}$ hydrocarbons) gas chromatograph analyzer. The catalysts were loaded in the micro-reactors as whole particles (not crushed). In each test, 38 cc of catalyst and 38 cc of SiC (an inert diluent) were loaded in the micro-reactor in four stages as shown in Table 2.

TABLE 2

| Stage | Catalyst, cc. | SiC, cc |
|---|---|---|
| 1 (inlet) | 1.9 | 17.1 |
| 2 | 5.7 | 13.3 |
| 3 | 11.4 | 7.6 |
| 4 (outlet) | 19.0 | 0 |

The feed was doped with isopropanol and 1,1,1-thrichloroethane to provide the desired target levels of 20 ppmv of $H_2O$ and 1 ppmv of Cl in the gas phase. The "extra" (unwanted) water in the feed was removed prior to the test by passing the feed trough a vessel filled with 4A molecular sieve. The tests were conducted as constant-octane (99 $C_5$+RON) deactivation (Stability) tests at 2.4 hr$^{-1}$ LHSV, 1.03 MPa and 3 mol $H_2$/mol HC. These conditions, as well as the above catalyst loading arrangement were chosen in order to force the catalyst to perform harder and decline faster. In order to maintain the product octane (C5+RON) at constant level throughout the run the reactor wall temperature was adjusted as needed to correct for the Activity decline.

FIGS. 1 and 2 show the $C_5$+ yield decline and Reactor Wall Temperature (Activity decline) data, respectively, for Catalysts A to H. Table 3 shows the corresponding Activity and $C_5$+ yield decline rates and Coking rates. The analysis of the data reveals that the bismuth-containing Catalyst F exhibited the lowest Coking Rate and $C_5$+ yield and Activity decline (i.e., the highest Stability) among the conventional catalysts. Also, comparison of the data for Catalysts G and H reveals that the addition of phosphorus to the carrier provides somewhat better $C_5$+ yields but decline and Coking rates similar to the pure alumina-supported Catalyst H. Therefore, the addition of P alone does not suppress the Coking Rate and does not improve the Stability of reforming catalysts. In contrast, comparison of the decline data for the bismuth- and phosphorus-containing catalysts of this invention shows that their Coking rates and decline rates depend very strongly on the bismuth concentration. Surprisingly, Catalysts B, C and D, containing 0.10 wt. % to 0.06 wt. % Bi and 0.3 wt. % P exhibited significantly lower Coking rates and $C_5$+ yield and Activity decline rates; i.e., higher Stability relative to the catalysts made from supports containing Bi-only, P-only, and pure alumina, Catalysts F, G and H. These data demonstrate that the inclusion of the proper concentrations of both bismuth and phosphorus in a carrier used to make naphtha reforming catalysts has a synergistically beneficial effect on Coking Rate and Stability performance.

TABLE 3

Ave. Hourly Decline Rates

| Catalyst | Pt/Bi/P, wt. % | Activity, ° C./hr. | $C_5$+ Yield, vol. %/hr. | Coking Rate, wt. %/hr. |
|---|---|---|---|---|
| A | 0.25/0.17/0.3 | +0.357 | −0.069 | +0.074 |
| B | 0.25/0.1/0.32 | +0.270 | −0.043 | +0.058 |
| C | 0.25/0.07/0.28 | +0.270 | −0.034 | +0.054 |
| D | 0.26/0.06/0.29 | +0.258 | −0.045 | +0.052 |
| E | 0.26/0.04/0.3 | +0.332 | −0.056 | +0.068 |
| F | 0.24/0.06/0 | +0.300 | −0.054 | +0.061 |
| G | 0.3/0/0.3 | +0.458 | −0.087 | +0.072 |
| H | 0.3/0/0 | +0.390 | −0.095 | +0.074 |

Conventional catalysts such as Catalysts F, G and H are primarily used in cyclic reformer units where they are subjected to high severity operating conditions (low pressure and sometimes high moisture level in recycle gas). Under these conditions, the catalysts exhibit higher coking rates, i.e. rapid deactivation and require frequent (once every 1-2 weeks) regeneration. Catalysts B, C and D of the present invention will allow for significantly better Yields and Activity stability and significant extension of the time on stream before the need for regeneration relative to conventional catalysts. In addition, in the rare cases when longer run length is not desired, catalysts of the present invention will allow for significant reduction of the coke-burn-off and reactor turnaround time thus again providing some longer unit uptime and higher profitability.

Example 9

Comparative

This example compares the performance of the steamed and oxychlorinated Catalysts $D_{SO}$ and $G_{SO}$ from Example 5.

The operating conditions and catalyst loadings were as described in Example 8. FIGS. 3 and 4 show the $C_5$+ yield and Activity decline curves, respectively, obtained in these tests. The test data show that Catalyst $D_{SO}$ significantly outperformed conventional Catalyst $G_{SO}$, affording remarkably lower $C_5$+ yield and Activity decline rates, lower coke make rates and much higher $C_5$+ yield and Activity stability advantage than the one observed for fresh catalysts (see Example 8). This suggests that after very high unit moisture upset the Pt dispersion and the performance of Catalyst D of this invention will be much more readily restorable (via regeneration) than that of conventional Catalyst G.

Example 10

Comparative

This example compares the performance of a Pt- and Re-containing catalyst of the present invention (Catalyst I from Example 6) against conventional Pt- and Re-containing catalysts (Catalysts J, K and L from Example 7).

Samples of all four catalysts were used to catalyze the reforming of a full range commercial hydrotreated naphtha having a P/N/A content of 66/21/13 wt. %, respectively. The tests were conducted using the same equipment and under the same conditions as described in Example 8. FIGS. 5 and 6 show the $C_5$+ yield and reactor wall temperature (Activity decline) curves, respectively, for Catalysts I to L. Table 4 shows the corresponding Activity and $C_5$+ yield decline rates and coking rates.

The analysis of the data shows that Catalyst I of the present invention afforded significantly lower coking rates and lower $C_5$+ yields and activity decline rates; i.e., higher stability, relative to conventional Catalysts J to L. Thus, the data clearly show that the addition of the proper concentrations of both bismuth and P to the supports of noble metal-containing catalysts results in a synergistic improvement in catalyst performance. It is obvious that Catalyst I of this invention will allow the refiner to operate at significantly lower temperatures while maintaining $C_5$+ yield and achieving the desired octane level (conversion). In addition, in this particular case, Catalyst I will allow for significant extension of the run length, i.e. increased unit uptime and profitability. Catalyst I will also allow the refiner to increase profitability by increasing the unit throughput (feed space velocity) while still operating at acceptable reactor inlet temperatures, thereby producing more reformate with same octane per unit of time relative to the conventional catalyst systems. Catalyst I would be especially desirable for reformer units that are Activity limited.

TABLE 4

Ave. Hourly Decline Rates

| Catalyst | Pt/Re/Bi/P. wt. % | Activity, ° C./hr. | $C_5$+ Yield, vol. %/hr. | Coking Rate, wt. %/hr. |
|---|---|---|---|---|
| I | 0.25/0.26/0.06/0.3 | +0.184 | −0.016 | +0.070 |
| J | 0.26/0.24/0.06/0 | +0.284 | −0.035 | +0.076 |
| K | 0.25/0.25/0/0.3 | +0.247 | −0.020 | +0.074 |
| L | 0.25/0.25/0/0 | +0.281 | −0.027 | +0.075 |

Example 11

This example describes the preparation of a catalyst of the present invention via co-impregnation of the Pt, Bi, P and Cl on an alumina support.

An impregnating solution is prepared by mixing 0.77 ml of concentrated $HNO_3$, 1.97 ml of concentrated (12M) HCl, 0.660 g of a solution of chloroplatinic acid (denoted as CPA, 29.7 wt. % Pt), 0.080 g of Bi citrate (99.99% purity), 0.782 g of 85 wt. % solution of $H_3PO_4$ and 30 ml deionized water. The solution was stirred and diluted with deionized water to the total volume of 150 ml in a 500 ml graduated cylinder. The solution was then circulated with the aid of a peristaltic pump. In addition, $CO_2$ gas was bubbled at a very low rate through a gas dispersion tube placed in the bottom of the graduated cylinder and into the solution. This was done in order to provide $HCO_3^-$ anions which are known to those skilled in the art as capable of competing with the platinate anions for alumina surface and to provide for better distribution of the Pt atoms on the alumina support.

Once the solution circulation and $CO_2$ bubbling were established, 70 g of the pure alumina Support H (Example 2) were quickly added to the solution in the cylinder. The impregnating solution was then circulated over the support for 3 hrs while bubbling $CO_2$ and then the $CO_2$ gas and the circulation were stopped. The solution was drained and the catalyst was dried at 125° C. for 2 hr and at 250° C. for 4 hrs and then calcined at 525° C. for 1.5 hrs. The finished catalyst was analyzed and found to contain about 0.25 wt. % Pt, 0.06 wt. % Bi, 0.30 wt. % P and about 0.95 wt. % Cl.

Example 12

This example describes the preparation of a Pt- and Re-containing catalyst of the present invention via co-impregnation of the Pt, Re, Bi, P and Cl on the pure alumina support.

An impregnating solution is prepared by mixing 0.50 ml of concentrated $HNO_3$, 1.89 ml of concentrated (12M) HCl, 0.660 g of a solution of CPA, 0.302 g of $NH_4ReO_4$, 0.080 g of Bi citrate (99.99% purity), 0.782 g of 85 wt. % solution of $H_3PO_4$ and 30 ml deionized water. The solution was stirred and diluted with deionized water to the total volume of 150 ml in a 500 ml graduated cylinder. The solution was then circulated with the aid of a peristaltic pump. In addition, $CO_2$ gas was bubbled at a very low rate through a gas dispersion tube placed in the bottom of the graduated cylinder and into the solution. This was done in order to provide $HCO_3^-$ anions which are known to those skilled in the art as capable of competing with the platinate and perrhenate anions for alumina surface and to provide for better distribution of the Pt and Re atoms on the alumina support.

Once the solution circulation and $CO_2$ bubbling were established, 70 g of the pure alumina Support H (Example 2) were quickly added to the solution in the cylinder. The impregnating solution was then circulated over the support for 3 hrs while bubbling $CO_2$ and then the $CO_2$ gas and the circulation were stopped. The solution was drained and the catalyst was dried at 125° C. for 2 hr and at 250° C. for 4 hrs and then calcined at 525° C. for 1.5 hrs. The finished catalyst was analyzed and found to contain 0.25 wt. % Pt, 0.25 wt. % Re, 0.06 wt. % Bi, 0.30 wt. % P and about 0.95 wt. % Cl.

Example 13

This example describes the preparation of a catalyst of the present invention in which the bismuth is deposited on the alumina support by co-mulling and the Pt, P and Cl are deposited on the bismuth-containing support via impregnation.

An impregnating solution is prepared by mixing 0.77 ml of concentrated $HNO_3$, 1.97 ml of concentrated (12M) HCl, 0.660 g of a solution of CPA, 0.782 g of 85 wt. % solution of $H_3PO_4$ and 30 ml deionized water. The solution was stirred and diluted with deionized water to the total volume of 150 ml in a 500 ml graduated cylinder. The solution was then circulated with the aid of a peristaltic pump. In addition, $CO_2$ gas was bubbled at a very low rate through a gas dispersion tube placed in the bottom of the graduated cylinder and into the solution.

Once the solution circulation and $CO_2$ bubbling were established, 70 g of the bismuth-containing Support F (Example 2) were quickly added to the solution in the cylinder. The impregnating solution was then circulated over the support for 3 hrs while bubbling $CO_2$ and then the $CO_2$ gas and the circulation were stopped. The solution was drained and the catalyst was dried at 125° C. for 2 hr and at 250° C. for 4 hrs and then calcined at 525° C. for 1.5 hrs. The finished catalyst was analyzed and found to contain about 0.25 wt. % Pt, 0.06 wt. % Bi, 0.30 wt. % P and about 0.95 wt. % Cl.

Example 14

This example describes the preparation of a catalyst of the present invention in which the P is deposited on the alumina support by co-mulling and the Pt, Bi and Cl are deposited on the P-containing support via impregnation.

An impregnating solution is prepared, by mixing 0.77 ml of concentrated $HNO_3$, 1.97 ml of concentrated (12M) HCl, 0.660 g of a solution of CPA, 0.080 g of Bi citrate (99.99% purity) and 30 ml deionized water. The solution was stirred and diluted with deionized water to the total volume of 150 ml in a 500 ml graduated cylinder. The solution was then circulated with the aid of a peristaltic pump. In addition, $CO_2$ gas was bubbled at a very low rate through a gas dispersion tube placed in the bottom of the graduated cylinder and into the solution.

Once the solution circulation and $CO_2$ bubbling were established, 70 g of the P-containing Support G (Example 2) were quickly added to the solution in the cylinder. The impregnating solution was then circulated over the support for 3 hrs while bubbling $CO_2$ and then the $CO_2$ gas and the circulation were stopped. The solution was drained and the catalyst was dried at 125° C. for 2 hr and at 250° C. for 4 hrs and then calcined at 525° C. for 1.5 hrs. The finished catalyst was analyzed and found to contain about 0.25 wt. % Pt, 0.06 wt. % Bi, 0.30 wt. % P and about 0.95 wt. % Cl.

I claim:

1. A catalyst composition, comprising: a support; bismuth; phosphorous; platinum; and chlorine, wherein said support comprises γ-alumina, and wherein said bismuth is present in said catalyst composition in the range of from 0.05 wt. % to 0.1 wt. %, based on the weight of said catalyst composition, and said phosphorous is present in said catalyst composition in the range of from 0.05 wt. % to 0.6 wt. %.

2. A catalyst composition as recited in claim 1, wherein said platinum is present in said catalyst composition in the range of from 0.1 wt. % to 1 wt. %, based on the weight of said catalyst composition, and said chlorine is present in said catalyst composition in the range of from 0.05 wt. % to 2 wt. %, based on the weight of said catalyst composition.

3. A catalyst composition as recited in claim 2, further comprising: rhenium.

4. A catalyst composition as recited in claim 3, wherein said rhenium is present in said catalyst composition in the range of from 0.01 wt. % to 1 wt. %, based on the weight of said catalyst composition.

5. A catalyst composition as recited in claim 4, wherein said bismuth and said phosphorous are essentially homogenously distributed within said support.

6. A process, comprising: contacting naphtha feed with the catalyst of claim 5 under elevated temperature and pressure process conditions and yielding a product.

7. A process as recited in claim 6, wherein said elevated temperature and pressure process conditions include a temperature in the range of from 319° C. to 550° C., a space velocity in the range of from 0.5 hr⁻1 to 6 hr⁻1, a pressure in the range of from 0.1 MPa to 3.5 MPa and a hydrogen-to-hydrocarbon ratio in the range of from 1 mole/mole to 10 mole/mole.

8. A process, comprising: contacting naphtha feed with the catalyst of claim 3 under elevated temperature and pressure process conditions and yielding a product.

9. A process as recited in claim 8, wherein said elevated temperature and pressure process conditions include a temperature in the range of from 319° C. to 550° C., a space velocity in the range of from 0.5 hr⁻1 to 6 hr⁻1, a pressure in the range of from 0.1 MPa to 3.5 MPa and a hydrogen-to-hydrocarbon ratio in the range of from 1 mole/mole to 10 mole/mole.

10. A process, comprising: contacting naphtha feed with the catalyst of claim 4 under elevated temperature and pressure process conditions and yielding a product.

11. A process as recited in claim 10, wherein said elevated temperature and pressure process conditions include a temperature in the range of from 319° C. to 550° C., a space velocity in the range of from 0.5 hr⁻1 to 6 hr⁻1, a pressure in the range of from 0.1 MPa to 3.5 MPa and a hydrogen-to-hydrocarbon ratio in the range of from 1 mole/mole to 10 mole/mole.

12. A process, comprising: contacting naphtha feed with the catalyst of claim 2 under elevated temperature and pressure process conditions and yielding a product.

13. A process as recited in claim 12, wherein said elevated temperature and pressure process conditions include a temperature in the range of from 319° C. to 550° C., a space velocity in the range of from 0.5 hr⁻1 to 6 hr⁻1, a pressure in the range of from 0.1 MPa to 3.5 MPa and a hydrogen-to-hydrocarbon ratio in the range of from 1 mole/mole to 10 mole/mole.

14. A catalyst composition as recited in claim 1, wherein said bismuth is present in said catalyst composition in the range of from 0.05 wt. % to 0.08 wt. %, based on the weight of said catalyst composition, wherein said phosphorous is present in said catalyst composition in the range of from 0.1 wt. % to 0.4 wt. %, wherein said platinum is present in said catalyst composition in the range of from 0.15 wt. % to 0.6 wt. %, based on the weight of said catalyst composition, and wherein said chlorine is present in said catalyst composition in the range of from 0.1 wt. % to 0.5 wt. %, based on the weight of said catalyst composition.

15. A catalyst composition as recited in claim 14, further comprising: rhenium.

16. A catalyst composition as recited in claim 15, wherein said rhenium is present in said catalyst composition in the range of from 0.2 wt. % to 0.45 wt. %, based on the weight of said catalyst composition.

17. A process, comprising: contacting naphtha feed with the catalyst of claim 16 under elevated temperature and pressure process conditions and yielding a product.

18. A process as recited in claim 17, wherein said elevated temperature and pressure process conditions include a temperature in the range of from 319° C. to 550° C., a space velocity in the range of from 0.5 hr⁻1 to 6 hr⁻1, a pressure in the range of from 0.1 MPa to 3.5 MPa and a hydrogen-to-hydrocarbon ratio in the range of from 1 mole/mole to 10 mole/mole.

19. A process, comprising: contacting naphtha feed with the catalyst of claim 15 under elevated temperature and pressure process conditions and yielding a product.

20. A process as recited in claim 19, wherein said elevated temperature and pressure process conditions include a temperature in the range of from 319° C. to 550° C., a space velocity in the range of from 0.5 hr⁻1 to 6 hr⁻1, a pressure in the range of from 0.1 MPa to 3.5 MPa and a hydrogen-to-hydrocarbon ratio in the range of from 1 mole/mole to 10 mole/mole.

21. A process, comprising: contacting naphtha feed with the catalyst of claim 14 under elevated temperature and pressure process conditions and yielding a product.

22. A process as recited in claim 21, wherein said elevated temperature and pressure process conditions include a temperature in the range of from 319° C. to 550° C., a space velocity in the range of from 0.5 hr⁻1 to 6 hr⁻1, a pressure in the range of from 0.1 MPa to 3.5 MPa and a hydrogen-to-hydrocarbon ratio in the range of from 1 mole/mole to 10 mole/mole.

23. A process, comprising: contacting a naphtha feed with the catalyst of claim 1 under elevated temperature and pressure process conditions and yielding a product.

24. A process as recited in claim 23, wherein said elevated temperature and pressure process conditions include a temperature in the range of from 319° C. to 550° C., a space velocity in the range of from 0.5 hr⁻1 to 6 hr⁻1, a pressure in the range of from 0.1 MPa to 3.5 MPa and a hydrogen-to-hydrocarbon ratio in the range of from 1 mole/mole to 10 mole/mole.

25. A catalyst composition, consisting essentially of: a support that comprises γ-alumina; bismuth; phosphorous; platinum; chlorine; and, optionally, rhenium.

26. A catalyst composition as recited in claim 25, wherein said bismuth is present in said catalyst composition in the range of from 0.05 wt. % to 0.1 wt. %, based on the weight of said catalyst composition, and said phosphorous is present in said catalyst composition in the range of from 0.05 wt. % to 0.6 wt. %.

27. A catalyst composition as recited in claim 26, wherein said platinum is present in said catalyst composition in the range of from 0.1 wt. % to 1 wt. %, based on the weight of said catalyst composition, and said chlorine is present in said catalyst composition in the range of from 0.05 wt. % to 2 wt. %, based on the weight of said catalyst composition.

28. A catalyst composition as recited in claim 27, further consisting essentially of: rhenium.

29. A catalyst composition as recited in claim 28, wherein said rhenium is present in said catalyst composition in the range of from 0.01 wt. % to 1 wt. %, based on the weight of said catalyst composition.

30. A catalyst composition as recited in claim 29, wherein said bismuth and said phosphorous are essentially homogenously distributed within said support.

31. A catalyst composition as recited in claim 25, wherein said bismuth is present in said catalyst composition in the range of from 0.05 wt. % to 0.08 wt. %, based on the weight of said catalyst composition, wherein said phosphorous is present in said catalyst composition in the range of from 0.1 wt. % to 0.4 wt. %, wherein said platinum is present in said catalyst composition in the range of from 0.15 wt. % to 0.6 wt. %, based on the weight of said catalyst composition, and wherein said chlorine is present in said catalyst composition in the range of from 0.1 wt. % to 0.5 wt. %, based on the weight of said catalyst composition.

32. A catalyst composition as recited in claim 31, further consisting essentially of rhenium.

33. A catalyst composition as recited in claim 32, wherein said rhenium is present in said catalyst composition in the range of from 0.2 wt. % to 0.45 wt. %, based on the weight of said catalyst composition.

* * * * *